(12) United States Patent
Shah et al.

(10) Patent No.: US 9,155,989 B2
(45) Date of Patent: Oct. 13, 2015

(54) METHOD AND SYSTEM FOR GAS PURIFICATION WITH FIRST DIRECT ABSORPTION STEP AND SECOND ABSORPTION STEP BY MEANS OF MEMBRANE CONTACTOR

(75) Inventors: Kamal C. Shah, Sugar Land, TX (US); Pål Helge Nøkleby, Sandefjord (NO); Geir Vingelven, Høvik (NO)

(73) Assignee: AKER PROCESS SYSTEMS AG, Lysaker (NO)

( * ) Notice: Subject to any disclaimer, the term of this patent is extended or adjusted under 35 U.S.C. 154(b) by 241 days.

(21) Appl. No.: 14/005,464

(22) PCT Filed: Mar. 16, 2012

(86) PCT No.: PCT/EP2012/054665
§ 371 (c)(1),
(2), (4) Date: Dec. 16, 2013

(87) PCT Pub. No.: WO2012/123571
PCT Pub. Date: Sep. 20, 2012

(65) Prior Publication Data
US 2014/0090556 A1 Apr. 3, 2014

Related U.S. Application Data (60) Provisional application No. 61/453,145, filed on Mar. 16, 2011.

(30) Foreign Application Priority Data

Mar. 28, 2011 (NO) .................................. 20110472

(51) Int. Cl.
*B01D 53/18* (2006.01)
*B01D 53/14* (2006.01)
(Continued)

(52) U.S. Cl.
CPC ........ *B01D 53/1456* (2013.01); *B01D 53/1406* (2013.01); *B01D 53/1425* (2013.01);
(Continued)

(58) Field of Classification Search
CPC .. B01D 53/18; B01D 53/185; B01D 53/1406; B01D 53/1456; B01D 53/1425
USPC ...................... 95/45, 149, 187, 199, 223, 236
See application file for complete search history.

(56) References Cited

U.S. PATENT DOCUMENTS

| | | |
|---|---|---|
| 4,997,630 A | 3/1991 | Wagner et al. |
| 4,999,031 A | 3/1991 | Gerhardt et al. |

(Continued)

FOREIGN PATENT DOCUMENTS

| | | | |
|---|---|---|---|
| JP | 2007297605 A | * | 11/2007 |
| WO | 99/13963 | | 3/1999 |

(Continued)

OTHER PUBLICATIONS

International Search Report issued Jul. 4, 2012 in International Application No. PCT/EP2012/054665.
(Continued)

*Primary Examiner* — Robert A Hopkins
(74) *Attorney, Agent, or Firm* — Wenderoth, Lind & Ponack, L.L.P.

(57) ABSTRACT

A method and system for purification of a pressurized gas stream, wherein the method includes in a first absorption step bringing the pressurized gas stream in direct contact with a first absorption solution absorbing at least part of the acidic gases, in the gas stream obtaining a gas liquid mixture; and separating the gas liquid mixture in a partly purified pressurized gas stream and a first rich absorption solution. In a second downstream absorption step bringing the partly purified pressurized gas in contact with a second absorption solution through a membrane contactor, obtaining a second rich absorption solution and a purified pressurized gas stream. The first absorption solution is a partially lean absorption solution.

21 Claims, 8 Drawing Sheets

(51) Int. Cl.
 *B01D 53/22* (2006.01)
 *C10L 3/10* (2006.01)

(52) U.S. Cl.
 CPC .......... *B01D53/1462* (2013.01); *B01D 53/185* (2013.01); *B01D 53/229* (2013.01); *C10L 3/102* (2013.01); *B01D 2252/2021* (2013.01); *B01D 2252/2025* (2013.01); *B01D 2252/20431* (2013.01); *B01D 2252/20468* (2013.01); *B01D 2252/20484* (2013.01); *B01D 2252/20489* (2013.01); *B01D 2258/05* (2013.01)

(56) References Cited

U.S. PATENT DOCUMENTS

| | | | |
|---|---|---|---|
| 6,228,145 | B1 | 5/2001 | Falk-Pedersen et al. |
| 2002/0014438 | A1 | 2/2002 | Swan, III |
| 2008/0210092 | A1 | 9/2008 | Buckles et al. |
| 2012/0111192 | A1 | 5/2012 | Nazarko et al. |

FOREIGN PATENT DOCUMENTS

| | | |
|---|---|---|
| WO | 2008/097839 | 8/2008 |
| WO | 2010/102877 | 9/2010 |
| WO | 2010/111996 | 10/2010 |

OTHER PUBLICATIONS

Norwegian Search Report issued Oct. 6, 2011 in Norwegian Patent Application No. 20110472.

Written Opinion of the International Searching Authority issued Jul. 4, 2012 in International Application No. PCT/EP2012/054665.

Chakma, A: "$CO_2$ Capture Processes—Opportunities for Improved Energy Efficiencies", Energy Conversion and Management, Elsevier Science Publishers, Oxford, GB, vol. 38, No. 1001, Jan. 1, 1997, pp. S51-S56, XP004061574.

\* cited by examiner

METHOD AND SYSTEM FOR GAS PURIFICATION WITH FIRST DIRECT ABSORPTION STEP AND SECOND ABSORPTION STEP BY MEANS OF MEMBRANE CONTACTOR

This application claims the benefit of U.S. Provisional Application No. 61/453,145, filed Mar. 16, 2011.

This invention relates to a method and system for purification of gas, in particular hydrocarbonaceous gas such as natural gas comprising $H_2S$, mercaptans, $CO_2$ and other acidic contaminants.

BACKGROUND

Purification of pressurized hydrocarbonaceous gas, including natural gas, biogas etc, hereinafter named as gas, may be desirable or necessary for a number of reasons. Removal of acidic contaminants such as $CO_2$ and or sulphide contaminants from the gas improves the quality of the gas product. The acidic contaminants include $CO_2$, $H_2S$, mercaptans, $CS_2$, COS, and $SO_2$.

Some of the challenges to be achieved with respect to purification are to minimize plant size, energy consumption, operational and investment cost, carry over of absorbent and pressure drop.

PRIOR ART

U.S. Pat. No. 6,228,145 describes a method for purifying gas using membranes and absorbent, whereby the absorbent passing on one side of the membrane is absorbing components to be purified from the gas on the other side of the membrane. This publication points at some benefits utilizing membranes, such as that the division between the gas and solvent phases makes it possible to employ a high gas rate in the absorber without the solvent being carried over, and that a membrane contactor has a high packing factor ($m^2/m^3$).

The book "Gas Purification" by Arthur Kohl and Richard Nielsen, fifth edition, published by Gulf Publishing Company describes on pages 59-62 an absorption process, including split-stream cycles (FIG. 2-12), and co-current absorption (FIG. 2-13, 2-14).

WO99/13963 discloses a method for removing $CO_2$ from natural gas including turbulent mixing of gas and liquid absorbent.

US2002/014438, U.S. Pat. No. 4,997,630 and U.S. Pat. No. 4,999,031 discloses different types of multiple step absorptions processes.

WO2010/102877A1 discloses a method and apparatus for washing absorbent.

The industry has looked into various ways to utilize membrane technology combined with liquid absorbent to achieve a more compact and efficient purification plant, but still these existing solutions can be extensive as membranes and regenerating absorbent to lean absorbent are expensive. Hence, a further way to minimize membrane and lean absorbent extent would be strongly desirable.

OBJECTIVE OF THE INVENTION

An objective of the present invention is to provide a method for purification of gas with reduced overall plant size, energy consumption, operational cost and investment cost.

Another goal is to provide a method that reduces the carry over of absorbent to the gas phase from a direct absorption step. Further an aim is to provide a method with a low pressure drop especially when the gas to be purified is pressurized.

Yet another objective is to provide additional pressure control.

A further objective is to provide a system able to performing the method.

DESCRIPTION OF THE INVENTION

The present invention provides a method for purification of a pressurized gas stream comprising acidic gases, wherein the method comprises in a first absorption step bringing the pressurized gas stream in direct contact with a first absorption solution absorbing at least part of the acidic gases, resulting in a gas liquid mixture, separating the gas liquid mixture in a partly purified pressurized gas stream and a first rich absorption solution, in a second downstream absorption step bringing the partly purified pressurized gas in contact with a second absorption solution through a membrane contactor, obtaining a second rich absorption solution and a purified pressurized gas stream, and wherein the first absorption solution is a partially lean absorption solution.

In one aspect of the method according to the present invention the second absorption solution is a lean absorption solution.

In another aspect of the method according to the present invention the second absorption solution is a partially lean absorption solution and wherein the first and the second absorption solutions contain a physical absorbent.

Accordingly the present invention provides a method comprising two absorption steps where the first step is based on direct contact between the gas and the absorbent, where the second step is based on the use of a membrane contactor. The use of a direct, co-current contactor is known to provide a compact absorber but also to result in carry over of absorbent to the gas phase. If a second absorption step is needed downstream a direct contactor, then liquid content in the gas phase due to carry over traditionally has been considered to be limiting for the choice of absorption technique for the second step.

Further, membrane contactors are pressure sensitive and normally require pressure control or equilibration of pressure over the membrane. This has generally been considered as a limitation as to which processes that can be performed upstream a membrane contactor.

Now, however the present inventors have found a solution to limit the carry over and control the pressure thereby making it possible to employ a compact membrane contactor in the second step.

In one aspect of the present invention the mixture is separated to the magnitude of the vapour pressure of the absorbent.

The method according to the invention may further comprise obtaining the partially lean absorption solution by depressurization of the first rich absorption solution, or the second rich absorption stream or a mixture of the first and the second rich absorption solution.

In one embodiment the method further comprises cooling the gas liquid mixture before it is separated.

The method according to the invention may in the first absorption step comprise feeding the first absorption solution co-currently with the gas stream. Alternatively the method comprises in the first absorption step feeding the first absorption solution counter-currently with the gas stream.

In another aspect of the present invention the method further comprises in the first absorption step spraying the first absorption solution into the gas stream.

To limit the carry over of absorbent to the membrane contactor the method may further comprises washing the partly purified gas stream and or passing the partly purified gas stream through a demister.

In yet another aspect the method according to the invention may further comprise equalizing the pressure over the membrane. The term "equalization of pressure" and similar as used here generally refers to the need to prepare a stable and controlled pressure surroundings for the membrane. In a preferred aspect of the method according to the present invention the method comprises controlling the pressure over the membrane to maintain a stable overpressure on the gas feed side.

In one aspect of the method the pressure is controlled utilizing a pressure equalizing line connecting the partly purified pressurized gas via a filter with an absorbent buffer tank arranged downstream the second absorption step. The filter stops absorbent solution being carried over into the partly purified gas when the flow in the pressure equalization line is towards the partly purified gas line.

In a different aspect of the method according to the present invention the pressure is controlled by controlled combination of the first rich absorption solution with the second rich absorption solution downstream the second downstream absorption step. Measurements of the pressure of the partly purified gas and the pressure of the second rich absorption solution can in this aspect be employed to control of the first rich absorbent stream into the second rich absorbent stream upstream or downstream of the valve controlling the flow of absorbent solution into the depressurization step.

In one embodiment the method further comprises mixing lean absorbent into the partially lean absorbent upstream the first absorption step to increase the absorption capability and the partially lean absorbent stream.

In another embodiment the method according to the invention further comprises cooling the partially lean absorbent upstream the first absorption step.

In yet another aspect of the present invention the first absorbent solution comprises a physical absorbent and the second absorbent solution comprises a chemical absorbent. Here the two absorption solutions are kept separated through out the method.

In a different aspect of the present invention the first and the second absorbent solution are both chemical absorbents. In one embodiment the absorbents and solvents of the two absorbent solutions are equal and the regeneration of the solutions is integrated in a way allowing at least part of the solutions to be mixed.

In another aspect of the present invention the first and the second absorbent solution are both physical absorbents and the regeneration of the solutions are integrated and the desorption is obtained through depressurization.

Further the present invention provides a system for purification of a pressurized gas stream comprising acidic gases, wherein the system comprises
 a first direct absorber unit comprising a gas inlet, an absorbent solution inlet and a gas liquid mixture outlet,
 a separation unit comprising a gas outlet, a rich absorbent solution outlet and an inlet connected to the gas liquid outlet,
 a flash desorber unit comprising a desorbed gas outlet, a partially lean absorbent outlet in fluid communication with the absorbent solution inlet of the first absorption unit and an inlet in fluid communication with the rich absorbent solution outlet of the separation unit,
 a second membrane absorber unit comprising on a first side of the membrane a gas inlet in fluid communication with the gas outlet of the separation unit, a purified gas outlet, and comprising on a second side of the membrane a lean absorbent solution inlet and a rich absorbent solution outlet.

In one embodiment of the system according to the present invention the inlet to the separation unit is tangentially and the separator unit is configured as a cyclone.

Further in one aspect of the system according to the invention, the absorbent solution inlet to the first absorber unit is equipped with at least one nozzle for spraying the absorbent solution into the gas. Where more than one nozzle is used the nozzles are separated over a distance forming a length of nozzles.

The term "direct absorber" as used here refers to a co-current absorber where the gas containing the compound to be absorbed is brought in direct contact with the fluid comprising the absorbent.

In another aspect of the system according to the present invention the first direct absorber unit is combined with the separation unit forming
 a combined first direct absorber separation unit comprising in a lower part the gas inlet, the absorbent solution inlet and the rich absorbent outlet, and in a upper part the gas outlet.

In this aspect a gas liquid mixture is formed in the lower part of the separation unit and the gas liquid mixture inlet and the gas liquid mixture outlet are the inlet and outlet to the lower part of the combined first direct absorber separation unit.

The present invention provides a system for purification of a pressurized gas stream comprising acidic gases, wherein the system comprises
 a combined first direct absorber separation unit comprising in a lower part a gas inlet, an absorbent solution inlet and a rich absorbent outlet, and in a upper part a gas outlet,
 a flash desorber unit comprising a desorbed gas outlet, a partially lean absorbent outlet in fluid communication with the absorbent solution inlet of the combined first absorber and separation unit and an inlet in fluid communication with the rich absorbent solution outlet of the combined absorber and separation unit,
 a second membrane absorber unit comprising on a first side of the membrane a gas inlet in fluid communication with the gas outlet of the combined absorber and separation unit, a purified gas outlet, and comprising on a second side of the membrane a lean absorbent solution inlet and a rich absorbent solution outlet.

The systems for purification according to the present invention may in one aspect comprise a system, wherein the inlet of the flash desorber is also in fluid communication with the rich absorbent solution outlet of the second membrane absorber. In another aspect of this system the rich absorbent solution from the separation unit is via a first and second valve in fluid communication with the rich absorption solution outlet from the membrane both upstream and downstream a third valve. The output from pressure measuring units arranged on the gas inlet and absorbent outlet side of the membrane unit are arranged to control the opening and closing of the three valves resulting in control of the pressure over the membrane.

In one embodiment the system for purification according to the present invention, the separation unit or the upper part of the combined absorber and separation unit further comprises a chimney tray and a system for introduction and recycling of a wash liquid.

In another embodiment the system, the separation unit or the upper part of the combined absorber and separation unit further comprises a demister.

In another aspect the system according to the invention, the system may further comprise a pressure buffer tank and a pressure equalization conduit in fluid communication with the rich absorbent outlet from the second membrane absorber and the separation unit or the combined absorption and separation unit or the gas outlet of the separation unit or the combined absorption and separation unit.

In yet another aspect the system for purification further comprises one or more coolers arranged upstream the inlet to the separation unit or the inlets to the combined absorber and separation unit and or the absorbent solution inlet to the first direct absorber unit.

The term "membrane" as employed herein shall be interpreted to refer to any material type, shape and form suitable for diffusion of acidic compounds there through in a semi permeable way. One particular suitable membrane type is hollow fibre type, which inner diameters are typical 0.01-0.1 micron, wherein gas is flowing. These small inner diameters are potential sensitive to liquids filling up volume and blocking gas flow.

The term "acidic gases" as used here refers to acidic contaminants such as $CO_2$ and or sulphide contaminants including $H_2S$, mercaptans, $CS_2$, COS, and $SO_2$.

The absorbent liquid that may be employed in the present invention is not specifically limited but may be any liquid comprising one or more absorbents capable of absorbing acidic contaminants such as $CO_2$ and or sulphide contaminants including $H_2S$, mercaptans, $CS_2$, COS, and $SO_2$.

Applicable liquid absorbents can be any current or future applicable liquid solutions suitable for absorption, including chemical absorbents where the absorbent undergoes a chemical reaction with the acid gases and physical absorbents where the absorption of $CO_2$ is based on the solubility of $CO_2$ in the physical absorbent without any chemical reaction taking place.

Examples of chemical absorbents include but are not limited to solutions of amines such as methyl-di-ethanol-amine (aMDEA, MDEA), mono alcohol substituted amines such as mono ethanol amine (MEA), triple alcohol substituted amines such as tri-ethanol amine (TEA), dissolved in a solvent such as water, alcohols, etc.

Typical physical absorbents can be N-methyl-2-pyrrolidone, methanol, methyl glymes of ethylene glycol (EG) oligomers, tri-n-butyl phosphate, propylene carbonate, saltwater, freshwater etc.

The term "lean absorption solution" as utilized herein refers to a fresh or fully regenerated absorption solution. Where fully regenerated refers an absorption solution which has been through a desorption process comprising heating of the absorbent solution for desorption of the acidic gases from the solution.

The term "partially lean absorption solution" as utilized herein refers to a rich absorption solution that has been only partly regenerated. The partially lean absorption solution has regained a considerable part of its capability to absorb acidic gases but also still contains significant amounts of acidic gases. The partially regeneration is generally obtained through depressurization and sometimes without heating.

One aspect of the present invention is the reduction of the mass rate of lean absorbent required in a membrane absorbing process, achieved by bulk removal of contaminants upstream of the membrane absorbing process. Since the mass rate of lean absorbent is reduced, the equipment and energy needed to regenerate the absorbent are reduced.

The use of membrane contactors as such is well known. Yeon et al. disclose in "Application of pilot-scale membrane contactor hybrid system for removal of carbon dioxide from flue gas", Journal of Membrane Science Volume 257, Issues 1-2, 15 Jul. 2005, pages 156-160, a study comparing membrane contactors to traditional absorption towers.

One benefit of using membrane absorption is that there are no carry over of absorbent into the gas. In conventional absorption towers the minimum carry over of absorbent is limited to evaporation pressure of absorbent, minus optional effect of extra washing methods, as illustrated in WO2010/102877A1.

For example if at 90 bar one type of absorbent, aMDEA, can approx absorb 0.6 mol $CO_2$ per mol aMDEA. When the aMDEA pressure is reduced, e.g. in a flash separator, this absorption capacity is typically reduced to approx. 0.3 mol $CO_2$ per mol aMDEA, and a partly lean absorbent is obtained. So the $CO_2$ content of the feed gas can by reduced significantly when brought in contact with the partly lean absorbent, and the absorbent can be regenerate without the need for regeneration by heat generation. The $CO_2$ level in the feed gas can typically be reduced from 10% to 5% by such bulk $CO_2$ removal. A challenge is however to avoid absorbent coming into the feed side of the membrane absorbent contactor utilized for further lowering the $CO_2$ content. Absorbent on the feed side may disturb (by clogging etc.) the absorption process. In one embodiment the membrane consists of hollow membrane tubes. On the gas side these have typically very small size diameter 0.1-1.0 micron. Furthermore if the absorbent is not separated efficiently before it is feed into the membrane absorber it will end up as a carry over in the gas product.

The invention solves this challenge by an efficient absorbent separation between the first step bulk absorption and the second step membrane absorption. Preferably the separation is to the magnitude of the vapour pressure of the absorbent. This can be achieved by using a separation volume large enough to accomplish this. Any known separation vessel suited for efficient separation of liquid and gas could be considered for this purpose, including vessel geometry, entry angles, and a mesh system to avoid mist and droplets to be carried over. In addition cyclones and/or a washing system can be provided for an even more efficient separation, if required.

The vapour pressure is by natural law a function of the temperature of the gas. The gas temperature will increase by the exothermic absorbent reaction, hence the pressure of the absorbent vapour that potentially could enter the membrane absorber on the gas feed side are high. The present invention solves this potential problem by an intermediate gas/absorbent separation, combined with gas cooling to reduce vapour pressure of absorbent. The gas cooling can be indirect with extra cold absorbent or/and with cooling of the gas in between the first step bulk absorption and the second step membrane absorption. In addition further steps for separation can also be used as for instance water wash and/or mist filter(s).

In one embodiment of the present invention rich absorbent solution is provided from the bottom of the membrane contactor to a flash unit, where the partially lean absorbent is obtained, and then it is pressurized and mixed with the feed gas.

The combined stream of feed gas and absorbent solution formed in the first step passes through a cooler (co-currently) this does not only cool the solvent, but also removes the heat of reaction and increases the equilibrium acid gas loading due to lower temperature and higher residence time available.

Due to the high acid gas concentration in the feed gas, high solvent loading can be achieved at the lower temperature that is maintained in the cooler.

In another embodiment feed gas and or the partially lean absorbent are cooled by separate coolers prior to the first absorption step. The cooling can be obtained through heat exchange with the rich absorbent from the first absorption step, or through heat exchange with the partially purified gas.

The removal of bulk acidic gas in the first step prior to the second step membrane contactor will effectively reduce the temperature increase due to the exothermic reaction in the membrane contactor which will help protect the membrane.

The overall solvent circulation is reduced due to the increase in acid gas loading obtained by the lower temperatures achieved in the cooler. This reduces the overall size of the plant and capital cost of the overall system. Substantial energy savings will be realized with the reduction in solvent circulation, as regeneration of absorbent solution is energy demanding. Both size/capital cost and the energy savings are directly proportional to the solvent circulation rate.

The needed degree of separation for the gas/liquid separation prior to entering the membrane contactor must be based on the membrane tolerance of the liquid carry over.

DETAILED DESCRIPTION OF THE INVENTION

The present invention will now be described in further detail with reference to the enclosed figures and the illustrated embodiments.

Figure 1:
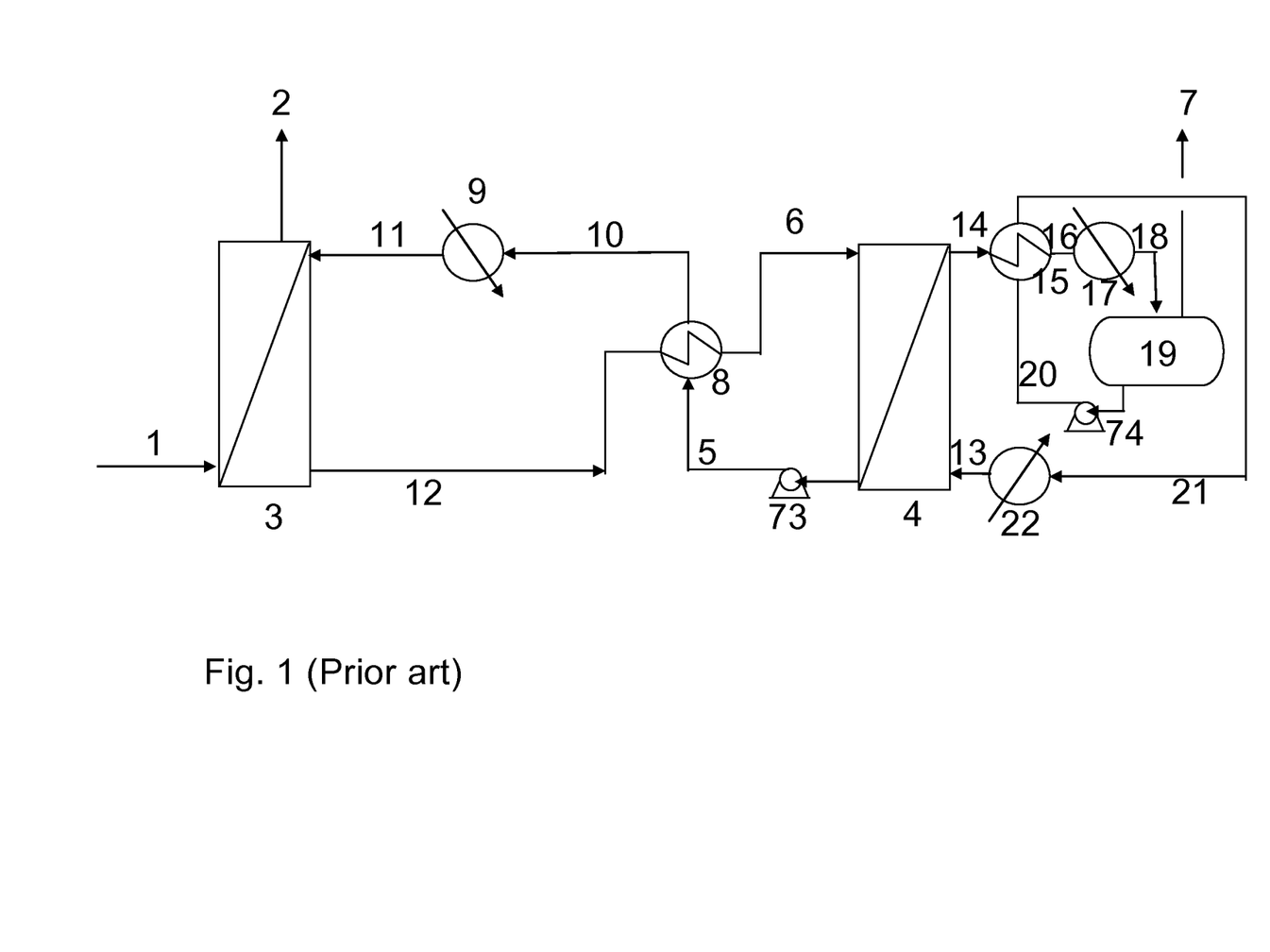
FIG. 1 illustrate an absorption-desorption process as disclosed in the state of the art according to U.S. Pat. No. 6,228,145.

FIG. 1 shows the layout of a process according to the prior art. A gas stream 1 comprising acidic gases is feed into a first end of a membrane gas liquid contactor 3 on a first side of the membrane. Clean gas leaves the contactor from a second end through conduit 2. A stream 11 of liquid absorbent is pasted counter-currently from the second end to the first end of the contactor on a second side of the membrane. The thereby obtained rich liquid absorbent is removed from the contractor trough pipe 12 and heated in a heat exchanger 8 before being entered as stream 6 into a desorption membrane contactor 4. In the membrane contactor 4 the acidic gases are released from the absorbent and pass the membrane and are transported out of the contactor 4 by a counter current steam stream entering from conduit 13 and leaving trough conduit 14. The steam is purified and recycled via a steam recycle loop. The rich steam is cooled first in heat exchanger 15 from where it proceeds through pipe 16 into cooler 17 before it via conduit 18 enters a separator 19. The cooling results in the condensation of the steam. The acidic gases leave the separator through conduit 7 whereas the condensed water phase is reheated after being removed via pump 74 through conduit 20. Heating is performed partly through heat exchange with the rich steam in heat exchanger 15. From there the partly heated stream is directed through conduit 21 into the heater 22. The heater 22 provides the additional heat for creating the counter current steam stream. The lean absorbent leaves the desorption membrane contactor 4 via pump 73 through conduit 5. The lean absorbent is firstly cooled through heat exchange with the rich absorbent in heat exchanger 8. From there the lean absorbent is past through conduit 10 into cooler 9 wherein the lean absorbent stream 11 is formed.

The use of the desorption membrane contactor limits the carry over of absorbent to the steam stream. Further any steam not condensed and therefore carried over together with the acidic gases in the stream 7 does not create considerable problems neither environmental nor process wise. However there might be a need to top up the water loss in the steam recycle loop.

Figure 2:
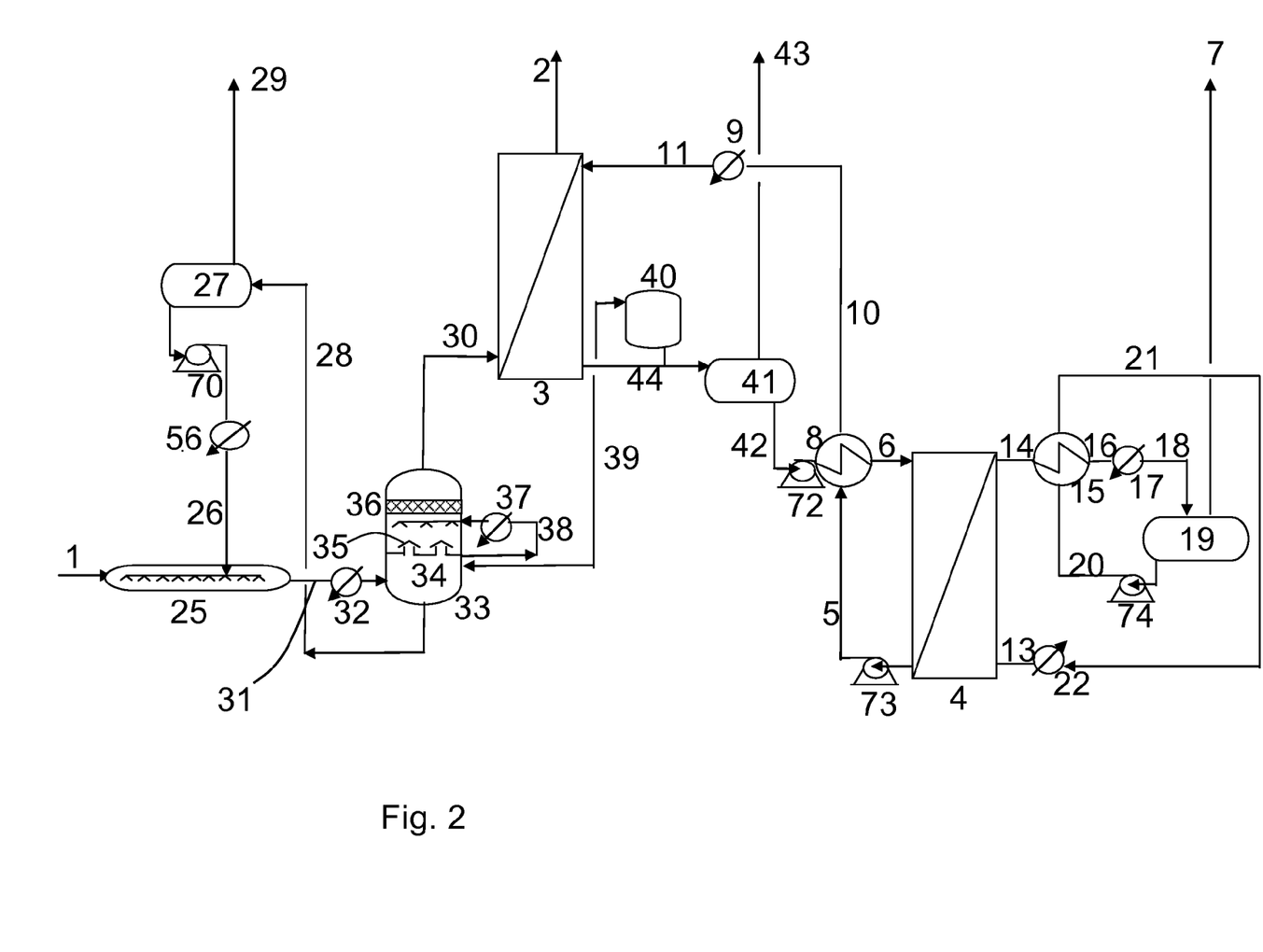
FIG. 2 illustrates schematically a first embodiment of the present invention.

FIG. 2 illustrates schematically a first embodiment of the method and system according to the present invention. Here gas is purified by two separate absorbent recycle loops, both loops includes flash separation, but only the last step also includes regeneration/desorption by heating to create a lean absorbent.

In the figures, where applicable, equal reference numbers is used for elements equal to elements present on FIG. 1.

In the first embodiment in FIG. 2 the gas stream 1 to be purified is introduced to a direct absorber unit 25 the absorbent solution feed to the direct absorber unit 25 through conduit 26 is a partially lean absorbent solution. A mixture of gas and absorbent leaves the absorber through conduit 31 and enters a cooler 32. The cooling prepares the gas for purification in the second absorption loop and also lowers the evaporation pressure of the absorbent.

After cooling the mixture is fed to a lower section 34 of a separator 33. Partly purified gas is removed from the top of the separator through conduit 30. The rich absorbent solution is recycle by transporting the solution through pipe 28 to a flash separator 27. At least a part of the absorbed acidic gases are released in the flash separator 27, the released acidic gases are removed through conduit 29. The thereby obtain partly lean absorbent solution is feed to the direct absorber unit 25 via pump 70 through conduit 26. Optionally a cooler 56 may be installed upstream the absorber unit 25. If the liquid in the partially lean absorbent loop have sufficiently large mass flow rate, and is cooled sufficiently, this cold partially lean absorbent will work as an open direct cooler on the feed gas.

The separator 33 may include a washing recycle loop to further promote separation of absorbents. The washing loop comprises upstream introduction of a washing fluid and a chimney tray 35 allowing gas with remaining absorbent and acidic gases to enter the washing zone, but which chimney also prevents washing fluid from falling down into the bottom zone 34. The fluid for the washing recycle loop could be any liquid acceptable as carry over and suitable for bringing down the absorbent, such as water. The washing fluid is removed from the chimney tray 35 via conduit 38 and cooled in cooler 37 before being recycled to the top of washing zone. Additionally the recycle loop may in a preferred embodiment include a bleed and makeup feed for this washing fluid, to replace contaminated washing fluid.

Alternatively or additionally the separator 33 may further comprise a demister 36 included to limit the carry over of absorbent into the second absorption loop.

The partly purified gas is introduced to the first side of a gas liquid membrane contactor unit 3 wherein the purification is completed to a satisfactory level and the purified gas is obtain through conduit 2. The liquid absorbent introduced counter currently to the contactor 3 from conduit 11 consists of lean absorbent regenerated in a similar manner as described above in relation to FIG. 1. The utilization of a fully regenerated lean absorbent secures that a satisfactory level of purification is obtained. Rich absorbent comprising the absorbed acidic gases leaves the contactor through conduit 44 and is feed to a second flash separator 41. Within the second flash separator 41 a part of the absorbed acidic gases are desorbed and removed through conduit 43, whereas the partly regenerated absorbent solution through conduit 42 and via pump 72 is introduced to the full regeneration loop The system and method illustrated on FIG. 2 further comprises a pressure equalization line 39 between the lower part of the separation unit 33 and a buffer tank 40 connected to the rich absorbent conduit 44. The membranes utilized in the membrane contactor 3 are pressure sensitive and the equalization of pressure over the membrane improves the durability, stability and lifetime of the membranes. The pressure equalization line can as illustrated be connected to the separation unit 33 upstream the demister 36 so that any vaporised absorbent present in the buffer tank 40 is not carried over into the gas side of the membrane contactor 3. Alternative configurations of the pressure control and pressure equalization that can be combined with the disclosed system will be described in connection with FIGS. 3, 7 and 8.

In the embodiment illustrated on FIG. 2 the absorbent recycle loop for the first step is kept fully separated from the absorbent solution recycle loop of the second absorption step.

The absorbent in the first recycle loop can in one embodiment of the invention be a physical absorbent, and a chemical absorbent in the second absorption step. As physical absorbents are based on the solubility of the $CO_2$ in solvent, and not a chemical reaction, less or no heat is generated from this $CO_2$ absorption and less cooling would be required upstream absorption. Subsequently less or no heating would be required for desorption, hence saving in equipment and energy. In fact the physical absorbent can function as an open cooling system for the gas upstream the membrane contactor. Regeneration using physical absorbent is often accomplished sufficiently by pressure release only, i.e. no heating.

This combination of physical absorbent for bulk removal, and chemical absorbent in second stage, is advantageous in many in many cases as physical absorbent is usually less expensive, generates less heat, and are usually more environmental friendly. The combination achieves a size and cost effective system for gas purification.

Figure 3:
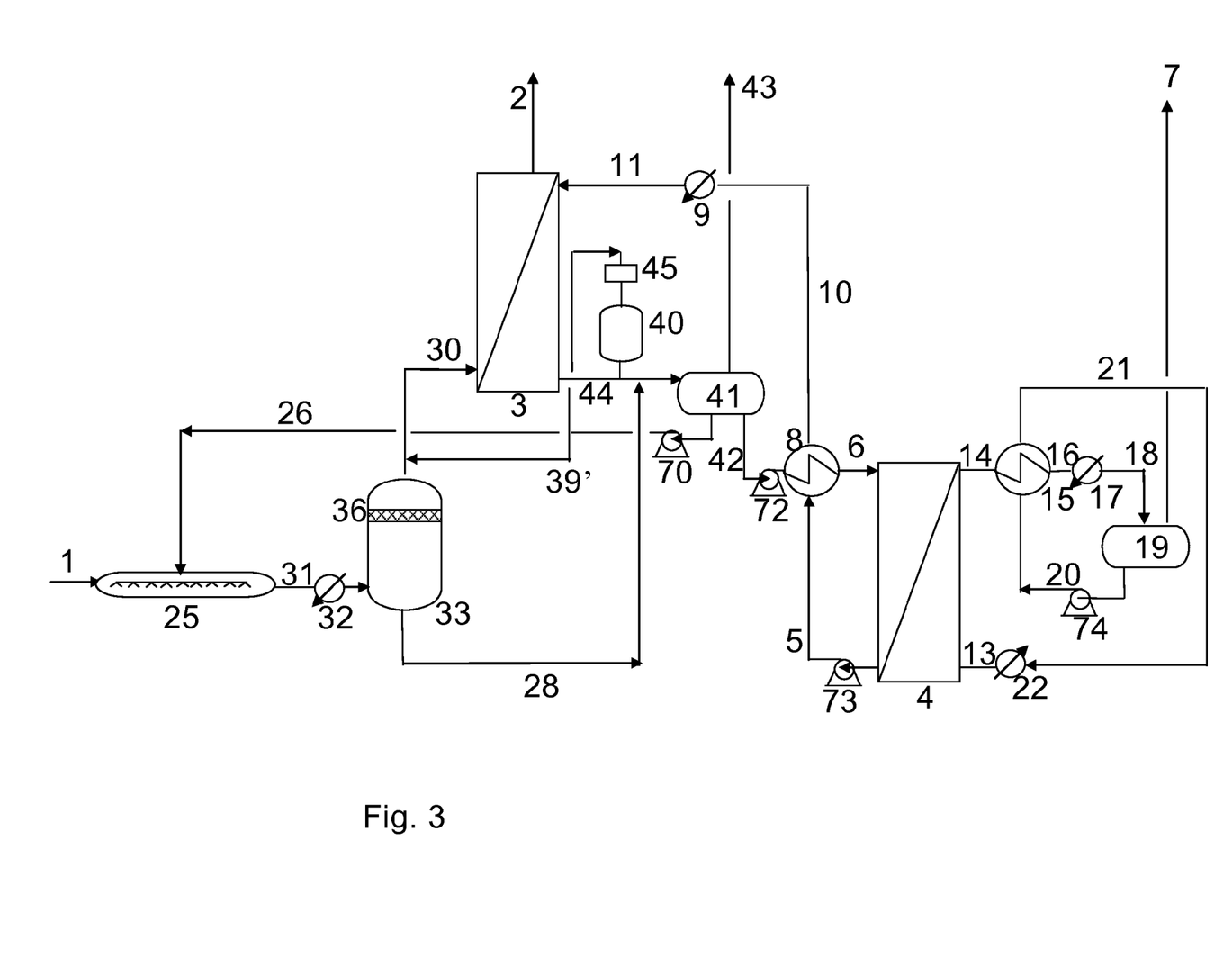
FIG. 3 illustrates schematically a second embodiment of the present invention.

FIG. 3 illustrates a second embodiment of the present invention, where the separate absorbent recycle loops are combined into a common flashing. Here the partly regenerated absorbent stream 26 introduced to the gas stream 1 in the direct absorber unit 25 is obtained from the second flash unit 41 and the first flash unit 27 is omitted. In this embodiment the rich absorbent removed from the separation unit 33 via conduit 28 is introduced to the second flash unit 41 via rich absorbent conduit 44. The second embodiment may optionally include a washing loop in connection with the separation unit 33.

Further FIG. 3 illustrates an alternative solution for controlling the pressure over the membrane. In this solution the pressure equalization line is connected to the partly purified gas upstream the membrane but downstream the demister 36. The buffer tank 40 and the equalization line are sized accordingly. Preferably, a filter 45 would then be arranged on top of the buffer tank 40 in connection with the pressure equalization line 39', to minimize any flow of absorbent into the gas phase 30 entering the membrane contactor. The filter 45 could be any means suitable to stop vapour or mist being transported in the pressure equalisation line, some examples include (not limiting) a mesh pad, vanes packs or fibre beds etc.

In the embodiment illustrated on FIG. 3 the pressure equalization line 39' is arranged between the conduit 30 transporting partly purified gas to the membrane contactor.

Figure 4:
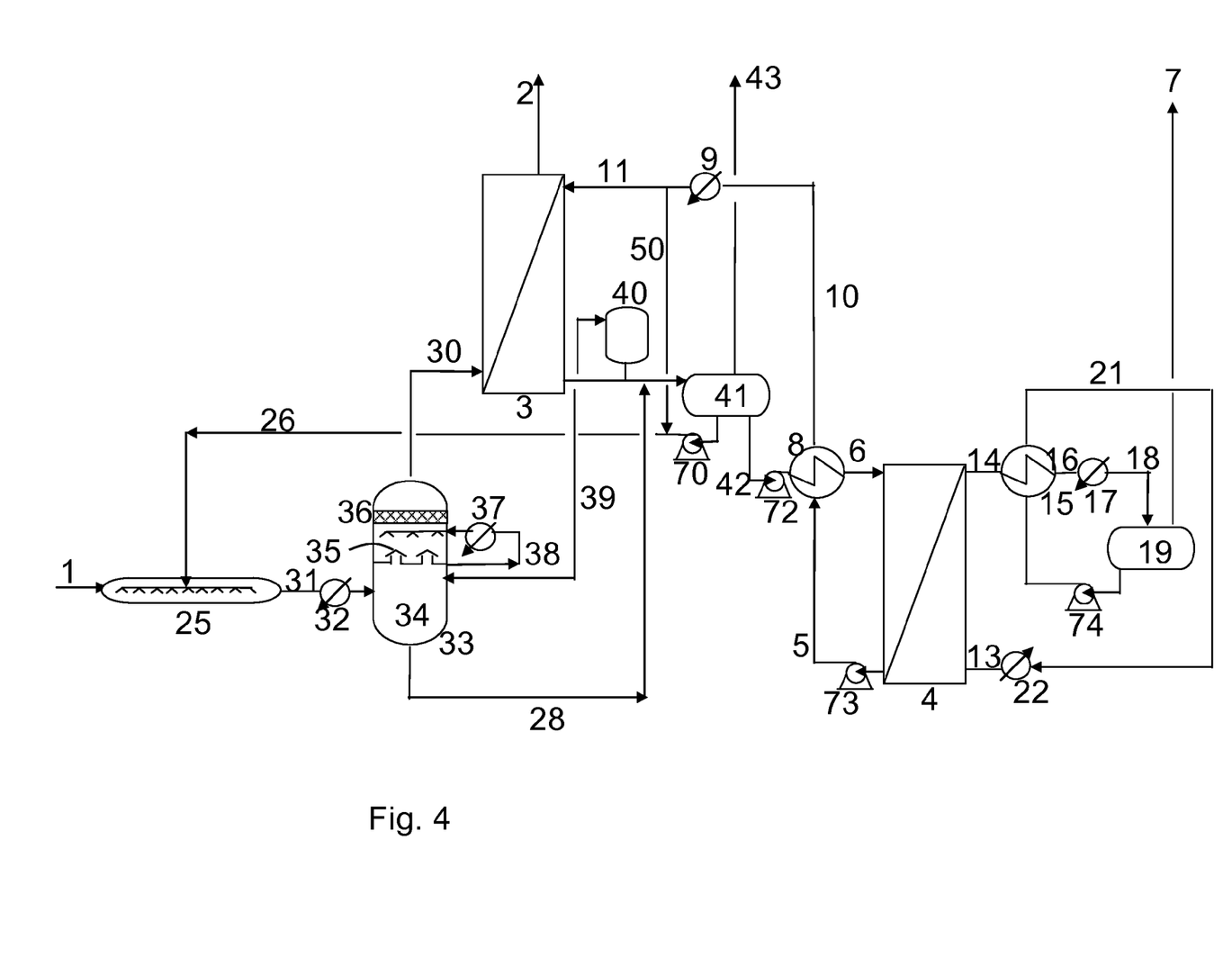
FIG. 4 illustrates schematically a third embodiment of the present invention.

FIG. 4 illustrates a third embodiment of the present invention. This embodiment equals the third embodiment but here a portion of the cooled lean absorbent from conduit 11 is via conduit 50 introduced to and mixed into the partly lean absorbent stream 26 in order to achieve a slightly more lean absorbent in the partly lean absorbent stream 26 to be utilized in the direct absorber 25.

Figure 5:
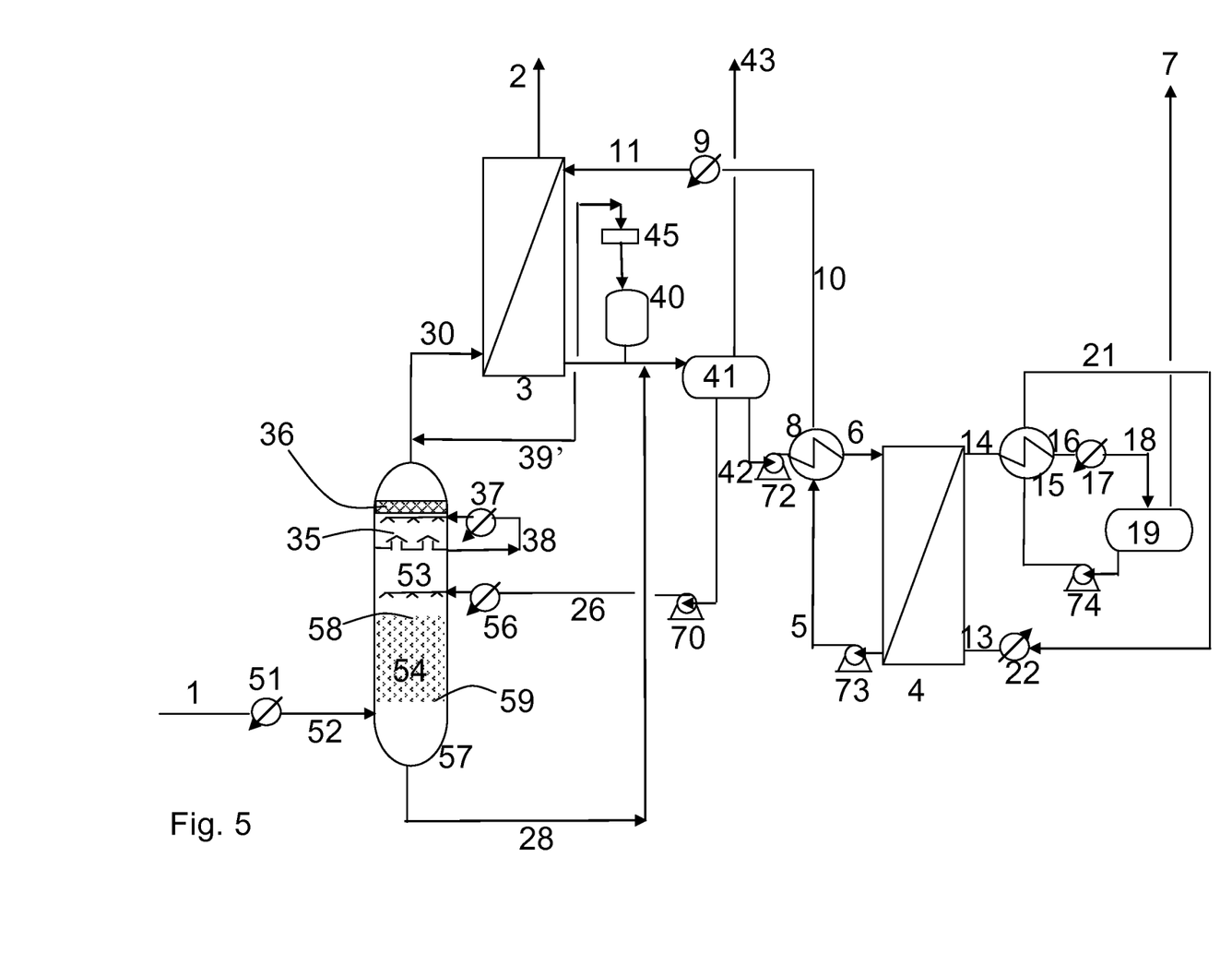
FIG. 5 illustrates schematically a fourth embodiment of the present invention.

FIG. 5 illustrates a fourth embodiment of the present invention. In this embodiment the direct absorber is included in the same unit as the separation unit in that the partly lean absorbent is directed from the second flash unit 41 via pipe 55 and a cooler 56 into the combined absorption and separation unit 57. The gas stream 1 is optionally cooled in cooler 51 before it enters the unit 57 through conduit 52. The gas enters the unit 57 in a lower zone 54 but above the outlet into the rich absorbent conduit 28. The partly lean absorbent is introduced in the upper part of the lower zone 54 which accordingly serves as a direct absorption zone. Within the lower zone 54 the unit contains a gas liquid mixture. Compared to the other embodiments the top part 58 and bottom part 59 of the lower zone 54 form the gas liquid mixture inlet and outlet. The cooled partly lean absorbent further cools the gas stream. FIG. 5 further illustrates that the pressure equalization line 39 may be connected to the combined absorption and separation unit 57 in a zone 53 upstream the washing zone. Here also a filter 45 upstream the buffer tank 40 may be utilized, in the connection to the pressure equalization line 39', to minimize any flow of absorbent to the gas phase 30 entering the membrane contactor. In this case the line 39' provides a more precise pressure control in case the washing section and the demister 36 itself should be the cause for additional pressure variations.

FIG. 5 illustrates a further aspect of the present invention which also could be included in the other illustrated embodiments. The system comprises a conduit 50 which allows for a stream of lean absorbent solution to be mixed with the partially lean absorbent prior to the first direct absorption step. Accordingly the absorbing capacity of the partially lean absorbent solution can be adjusted; further the lean absorbent solution cooled and therefore also cools the partially lean absorbent stream.

Figure 6:
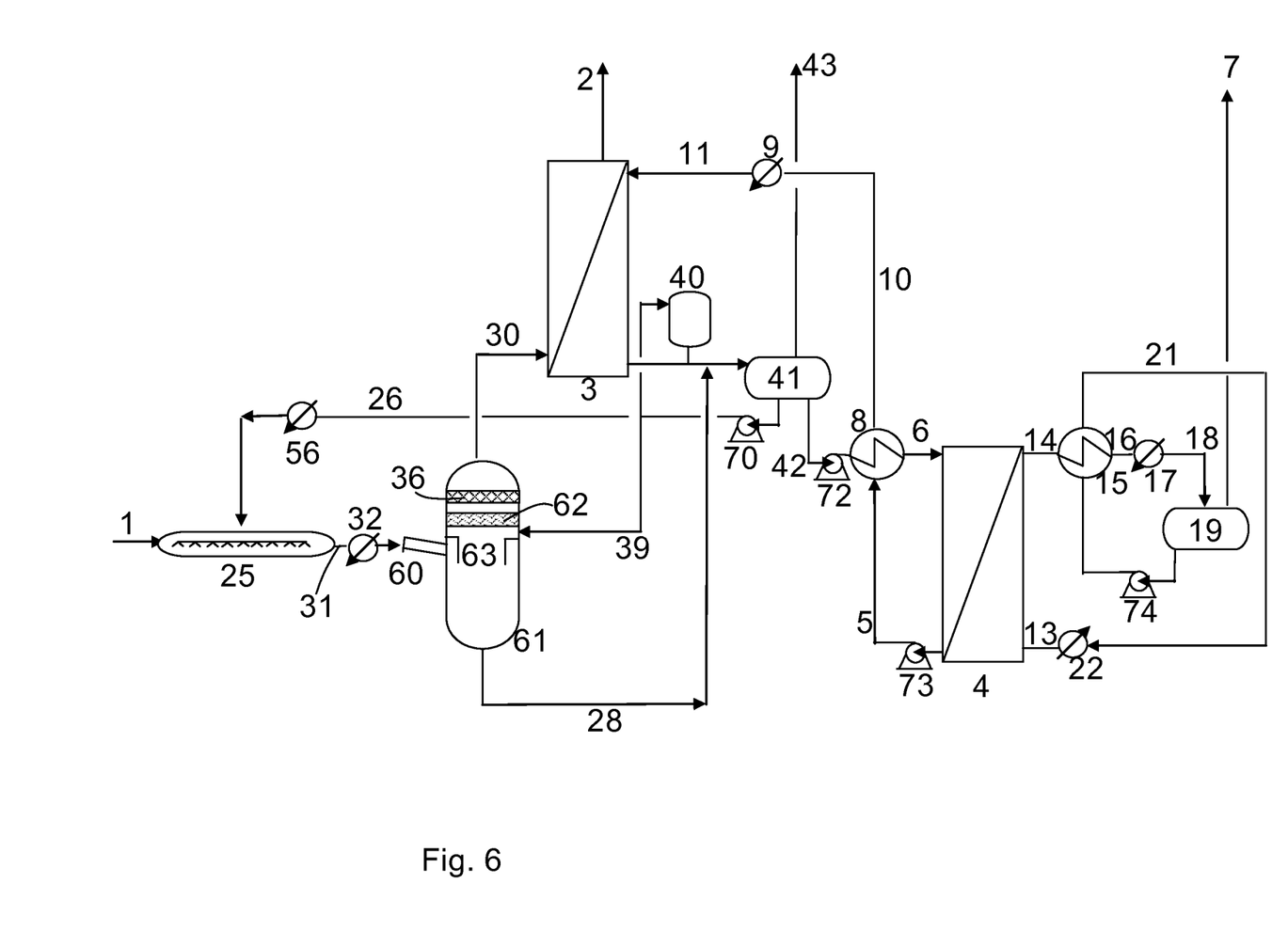
FIG. 6 illustrates schematically a fifth embodiment of the present invention.

FIG. 6 illustrates a fifth embodiment of the present invention. In this embodiment the separation unit 61 includes a tangentially and downwardly directed inlet 60 for the cooled gas and absorbent from the direct absorber 25. Accordingly the lower zone 63 of the separation unit assembles a cyclone separator. As illustrated the diameter of the inlet may be increase to dampen gas fluctuations that could result in pressure fluctuations over the membrane. The illustrated embodiment further comprises a vane pack 62 upstream the demister 36 to increase the separation and limit the carry over of absorbent.

In embodiment in FIG. 6 the partially lean absorbent is cooled by cooler 56, which can be used instead or in combination with a cooler 32 and or the optional cooler 51. The total cooling energy from these coolers should preferably be the sum of the exothermal energy from the first absorbent process and the energy to cool the gas sufficiently for the second absorption process. A large benefit of cooling the gas before it enters the membrane absorbent process using the absorbent is that it reduces the gas pressure drop which otherwise would be caused mechanically by the cooler 32. A low temperature of the gas also allows for better partially lean absorbent separation, as the evaporation pressure for the absorption solution is reduced accordingly with the temperature.

The absorbent cooler 56 is also illustrated in FIGS. 2 and 6. These figures show alternative embodiments of how cooling of the partially lean absorbent can be applied in addition to or instead of the cooler 32. The temperature of the partially lean absorbent entering the direct absorber unit 25 is lowered and this makes it possible to achieve higher acid gas to solvent loading of the absorbent stream leaving the direct absorber.

The invention describes a first and second absorption process, whereby the second absorption process utilizes membranes. The invention also includes that the first absorption process can be configured be in parallel and or series of first type absorption processes, and that the second absorption process can be configured in parallel and series of first type absorption processes.

In the case where a physical absorbent is used in first series and chemical absorbent in the second stage, the consequence of absorbent vapour exiting the separator in between the stages is not that critical, hence washing sequence may not be required. However, fluids from the chemical absorbent from the second stage then still would need to be prevented escaping through the pressure equalization line, hence in such configuration a filter in or upstream the buffer tank the preferably would be utilized.

Figure 7:
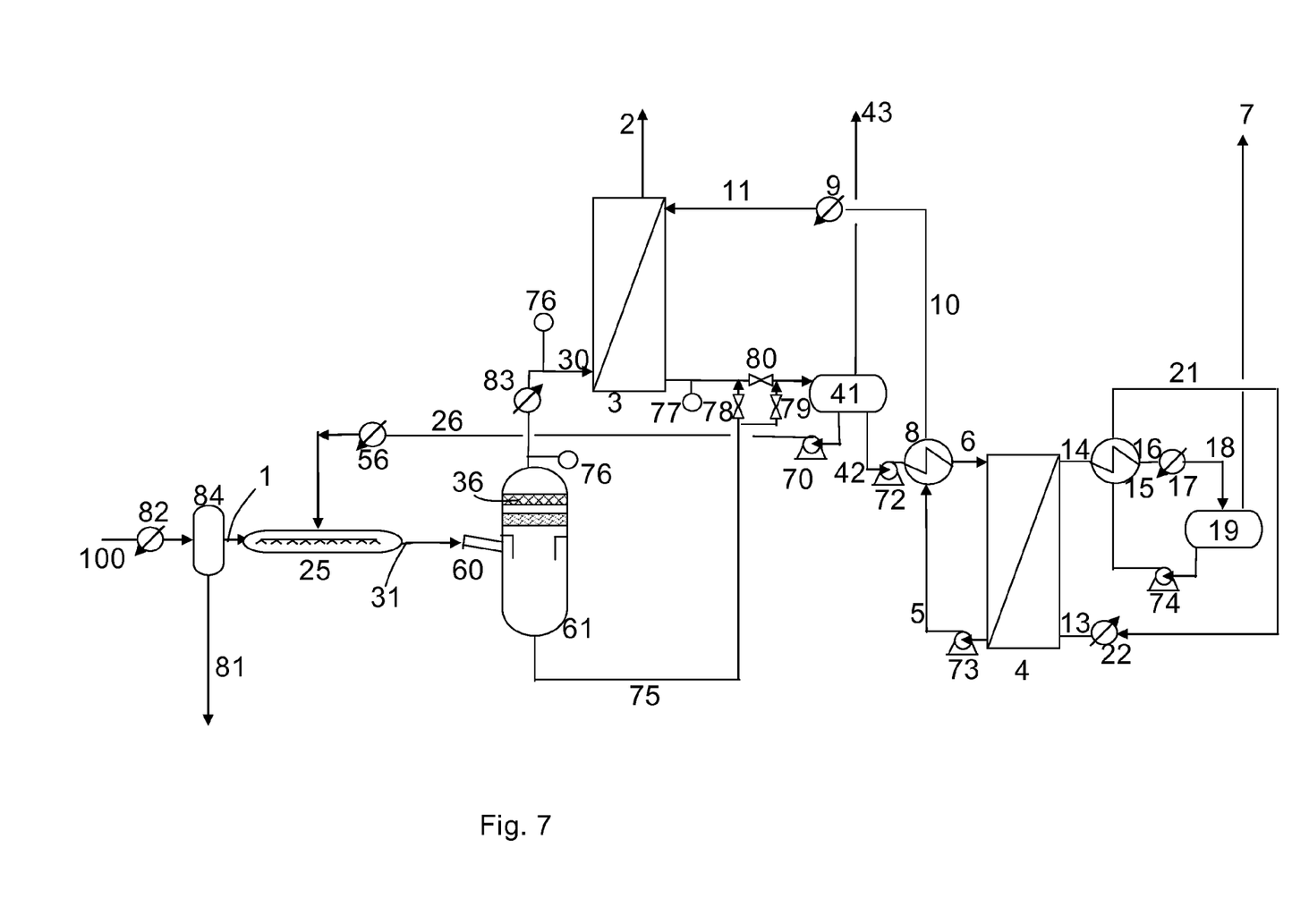
FIG. 7 illustrates a further embodiment of the present invention.

The further embodiment illustrated on FIG. 7 illustrates an alternative solution for controlling the pressure over the membrane. It is important that the control of the pressure equalisation is rapid and precise, and that the cross sectional diameter of the pressure equalisation line and proximity are design for sufficient response capability. The pressure equalisation could be regulated with adequate response time and membrane protection systems, for example such as shown in patent publication U.S. Pat. No. 6,649,047.

Membranes should preferably have an overpressure on the gas side, i.e. the tube side of the absorber membrane. This is to avoid a collapse of the tubes. This can be controlled by using a liquid equalisation line 75 between the separator 61 and the absorbent solution on the membrane side. The line 75 also provides the same functions a line 28 in the earlier drawings, transporting the first rich absorption solution to the flash unit 41. The pressure difference can be measured by the pressure instruments 76 and 77. The system comprises three valves 78, 79, and 80 which are employed to control the pressure of the rich absorption solution at the outlet of the membrane unit. At stable pressure conditions valve 79 is open and valve 78 is closed. Such a system will always have enough liquid to adjust pressure as liquid supply is provided by the first absorption step, provided that the separator is not drain out by the flow trough valve 79 into the flash separator 41. The prevention of the separator being drained off can be controlled by adjusting the valve 79 against a sufficient liquid level in the separator 61. If one would not have this sufficient supply of liquid 75 and control of liquid level in separator 61, a gas would enter instead in the liquid equalization line, which would be compressible, and not as efficient to adjust pressure efficiently enough. The configuration in FIG. 7 enables a combined efficient membrane protection and pressure control, and also with the equipment savings as the system does not require any other buffer tanks.

As liquid is relatively incompressible compared to gas this will create a rapid pressure adjustment to pressure variation of the gas feed 1.

For the desorption the gas flows preferably on the shell side of the membrane, so here the overpressure is not preferably in the absorbent liquid 6, but instead in the steam 13. The pressure from the absorbent liquid 6 and steam 13 are easier controlled as these are pressure generated from a controlled system, and not in a gas production 1 with potential severe gas fluctuations.

From US 2002/195251 it is known to cool gas to remove and separate contaminants/condensates upstream a membrane, and to heat the gas up again by using a cross heat exchanger before entering a membrane separator. However recognising that the solubility of carbon dioxide is a strong inverse function of the temperature of the absorbent, especially a physical absorbent such as seawater, cooling of the gas upstream and removing the contaminants including condensate upstream the first absorption step is preferable. If the condensates are not removed upstream the first absorption then they will condense in the separator 61 and be transported via line 75 together with the rich absorbent and continue via lines 79, 42, 6, 5, 10 and 11 and thereby end up end up on in the membrane on the absorbent side, where they are likely to coarse clogging of the membrane.

In the illustrated embodiment the gas stream 100 comprising condensates is cooled by cooler 82 and the condensates is removed as stream 81 in separator 84 before the condensate lean gas stream 1 enters the first absorber 25. In this embodiment the partially lean gas 30 may optionally be heated in heat exchanger 83 upstream the membrane separator.

In a preferred embodiment the gas being cooled down upstream the first absorption step is cross heat exchanged with the partly lean gas 30, the illustrated separate units 82 and 83 would then be illustrations of the two sides of the same unit.

In an alternative embodiment the gas 100 is heat exchanged with the separated absorbent 75, either as one cross heat exchanger or two heat exchangers in communication with each other or as two heat exchangers with a heat pump system in between.

In this embodiment one achieves better condensation upstream the first absorption step, and better desorption at depressurization stage 41, and one also recovers extra heat.

Figure 8:
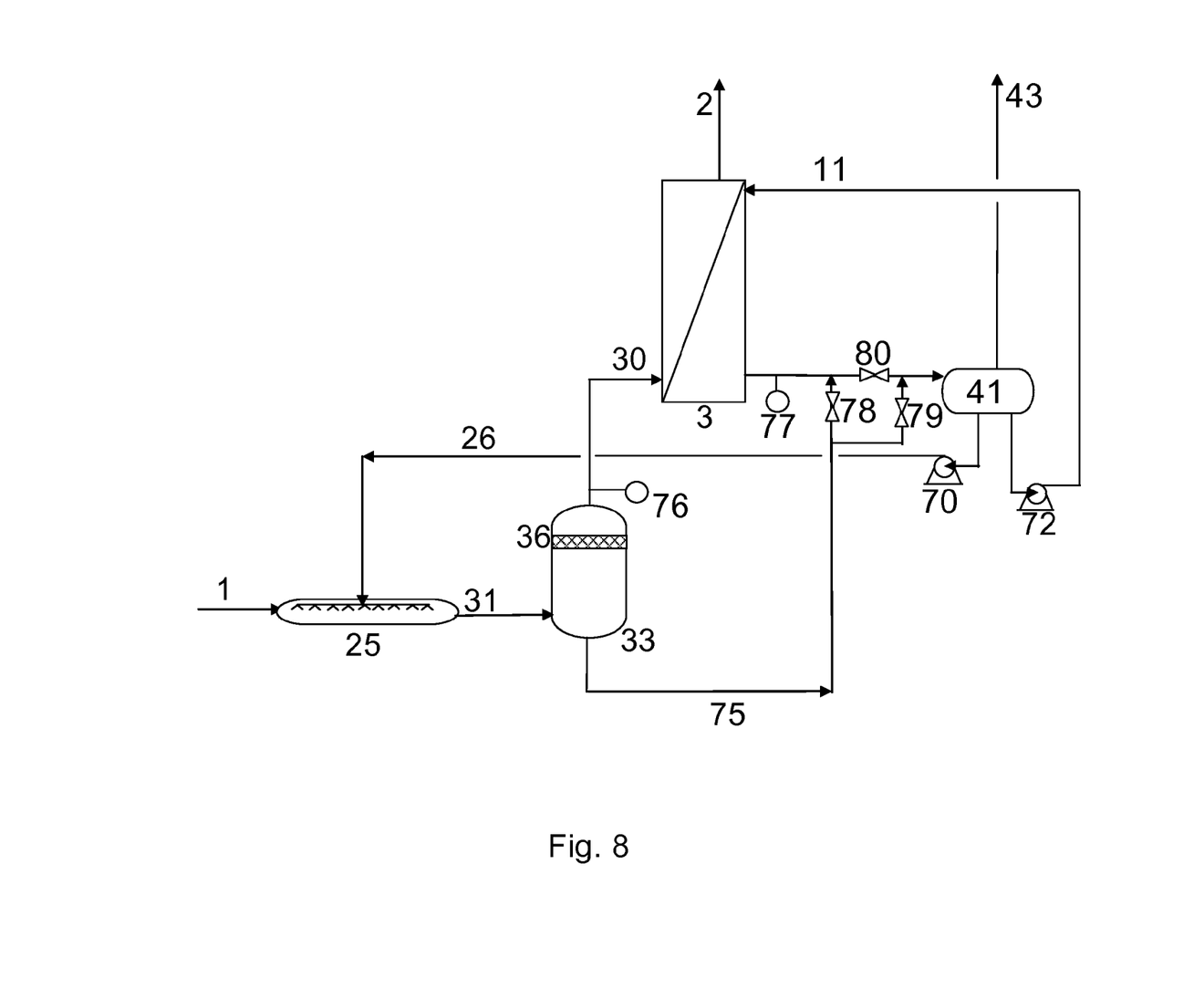
FIG. 8 illustrates an embodiment of the invention utilizing only a physical absorbent.

In the embodiment illustrated on FIG. 8 the gas stream 1 to be purified is introduced to a direct absorber unit 25 the absorbent solution feed to the direct absorber unit 25 through conduit 26 is a partially lean absorbent solution. In this embodiment a physical absorbent is utilized.

A mixture of gas and absorbent leaves the absorber through conduit 31. No cooling is required.

The mixture is fed to a lower section of a separator 33. Partly purified gas is removed from the top of the separator through conduit 30 after having past the optional demister 36. The rich absorbent solution is recycled by transporting the solution through pipe 75 to a flash separator 41. At least a part of the absorbed acidic gases are released in the flash separator 41, the released acidic gases are removed through conduit 43. The thereby obtain at least partly lean absorbent solution is feed to the direct absorber unit 25 via pump 70 through conduit 26.

The separator 33 may include a washing recycle loop to further promote separation of absorbents from the gas phase, not shown.

The partly purified gas is introduced to the first side of a gas liquid membrane contactor unit 3 wherein the purification is completed to a satisfactory level and the purified gas is obtain through conduit 2. The liquid absorbent introduced counter currently to the contactor 3 from conduit 11 consists of at least partly lean absorbent regenerated through flash desorption in unit 41 and pumped back by pump 72 in a similar manner as described above for the direct absorber. When employing a physical absorbent the depressurization release the absorbed acidic gases. In the illustrated embodiment no further desorption process is required. The pumps recreated the pressure and additional heating or cooling is optionally not required.

The system for pressure control is equal to the system illustrated on FIG. 7. The pressure is controlled by using a liquid equalisation line 75 between the separator 61 and the absorbent solution on the membrane side. The pressure difference can be measured by the pressure instruments 76 and 77. The system comprises three valves 78, 79, and 80 which are employed to control the pressure of the rich absorption solution at the outlet of the membrane unit.

The figures included here illustrates some embodiments of the present invention but these should however generally not be interpreted as limiting for the scope of the present invention as defined in the claims as a person skilled in the art will appreciate. A person skilled in the art will further appreciate that different solutions presented in the different illustrated embodiments can be freely combined without departing from the scope of the present invention.

The invention claimed is:

1. Method for purification of a pressurized gas stream comprising acidic gases, wherein the method comprises
in a first absorption step bringing the pressurized gas stream in direct contact with a first absorption solution absorbing at least part of the acidic gases, resulting in a gas liquid mixture,
separating the gas liquid mixture in a partly purified pressurized gas stream and a first rich absorption solution,
in a second downstream absorption step bringing the partly purified pressurized gas in contact with a second absorption solution through a membrane contactor, obtaining a second rich absorption solution and a purified pressurized gas stream, and
wherein the first absorption solution is a partially lean absorption solution.

2. Method according to claim 1, wherein the second absorption solution is a lean absorption solution.

3. Method according to claim 1, wherein the second absorption solution is a partially lean absorption solution and wherein the first and optionally also the second absorption solutions contain a physical absorbent.

4. Method according to claim 1, where the mixture is separated to the magnitude of the vapour pressure of the absorbent.

5. Method according to claim 1, further comprising obtaining the partially lean absorption solution by of the first rich absorption solution, or the second rich absorption stream or a mixture of the first and the second rich absorption solution.

6. Method according to claim 1, wherein the method further comprises cooling the gas liquid mixture before it is separated.

7. Method according to claim 1, wherein the method comprises in the first absorption step feeding the first absorption solution co-currently with the gas stream.

8. Method according to claim 1, wherein the method comprises in the first absorption step spraying the first absorption solution into the gas stream.

9. Method according to claim 1, wherein the method comprises washing the partly purified gas stream and or passing the partly purified gas stream through a demister.

10. Method according to claim 1, wherein the method comprises controlling the pressure over the membrane to maintain a stable overpressure on the gas feed side.

11. Method according to claim 1, wherein the method further comprises mixing lean absorbent into the partially lean absorbent upstream the first absorption step.

12. Method according to claim 1, wherein the method further comprises cooling the partially lean absorbent upstream the first absorption step.

13. Method according to claim 10, where the pressure is controlled utilizing a pressure equalizing line connecting the partly purified pressurized gas via a filter with an absorbent buffer tank arranged downstream the second absorption step.

14. Method according to claim 5, wherein the method comprises controlling the pressure over the membrane to maintain a stable overpressure on the gas feed side,
wherein the pressure is controlled by regulating a flow between the first rich absorption solution and the second rich absorption solution upstream the depressurization step obtaining the partially lean absorption.

15. System for purification of a pressurized gas stream comprising acidic gases, wherein the system comprises
a first direct absorber unit comprising a gas inlet, an absorbent solution inlet and a gas liquid mixture outlet,
a separation unit comprising a gas outlet, a rich absorbent solution outlet and an inlet connected to the gas liquid mixture outlet,
a flash desorber unit comprising a desorbed gas outlet, a partially lean absorbent outlet in fluid communication with the absorbent solution inlet of the first absorption unit and an inlet in fluid communication with the rich absorbent solution outlet of the separation unit,
a second membrane absorber unit comprising on a first side of the membrane a gas inlet in fluid communication with the gas outlet of the separation unit, a purified gas outlet, and comprising on a second side of the membrane a lean absorbent solution inlet and a rich absorbent solution outlet.

16. System according to claim 15, wherein the first direct absorber unit is combined with the separation unit forming
a combined first direct absorber separation unit comprising in a lower part the gas inlet, the absorbent solution inlet and the rich absorbent outlet, and in a upper part the gas outlet.

17. System for purification according to claim 15, wherein the inlet of the flash desorber is also in fluid communication with the rich absorbent solution outlet of the second membrane absorber.

18. System for purification according to claim 15, wherein the separation unit or the upper part of the combined absorber and separation unit further comprises a chimney tray and a system for introduction and recycling of a wash liquid.

19. System for purification according to claim 15, wherein the separation unit or the upper part of the combined absorber and separation unit further comprises a demister.

20. System for purification according to claim 15, wherein the system further comprises a pressure buffer tank and a pressure equalization conduit in fluid communication with the rich absorbent outlet from the second membrane absorber and the separation unit or the combined absorption and separation unit or the gas outlet of the separation unit or the combined absorption and separation unit.

21. System for purification according to claim 15, wherein the system further comprises one or more coolers arranged up stream the inlet to the separation unit or the inlets to the combined absorber and separation unit and or the absorbent solution inlet to the first direct absorber unit.

* * * * *